June 17, 1969

W. N. PHILLIPS 3,450,436

HIGH-LIFT SIDE DUMP MECHANISM

Filed Oct. 5, 1967

INVENTOR
WILLIAM N. PHILLIPS

BY
ATTORNEYS

June 17, 1969 W. N. PHILLIPS 3,450,436
HIGH-LIFT SIDE DUMP MECHANISM
Filed Oct. 5, 1967 Sheet 2 of 2
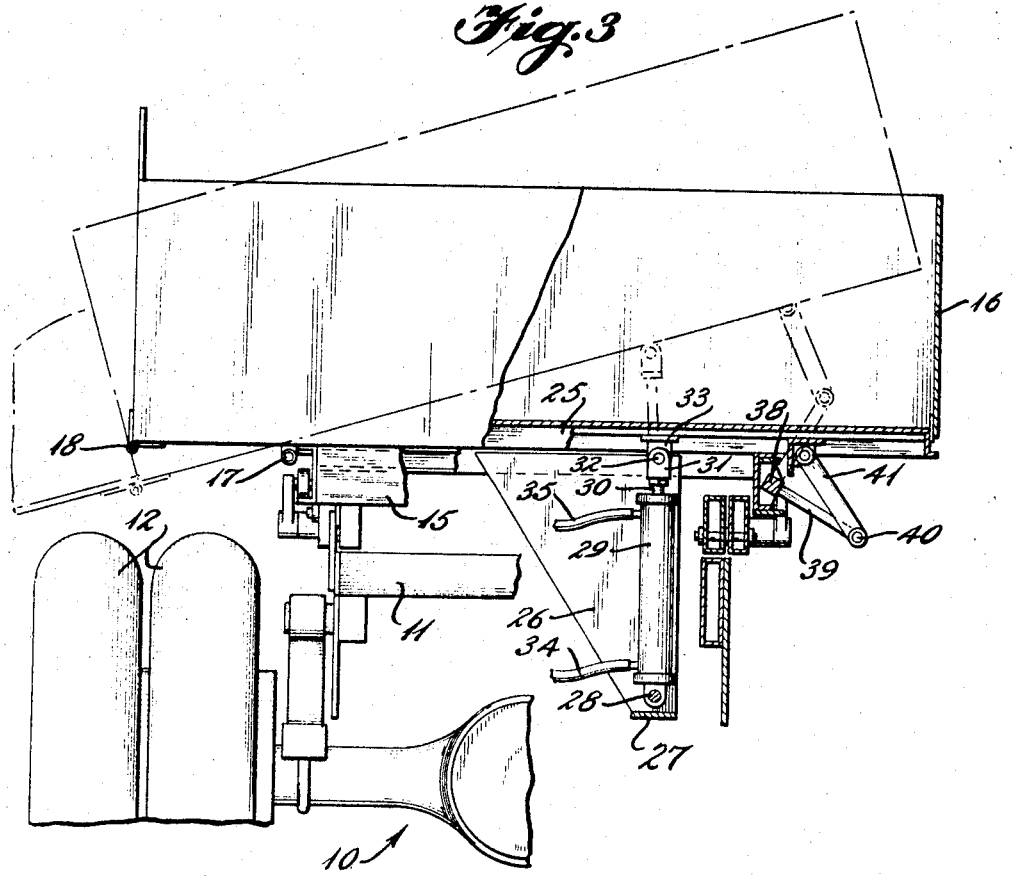
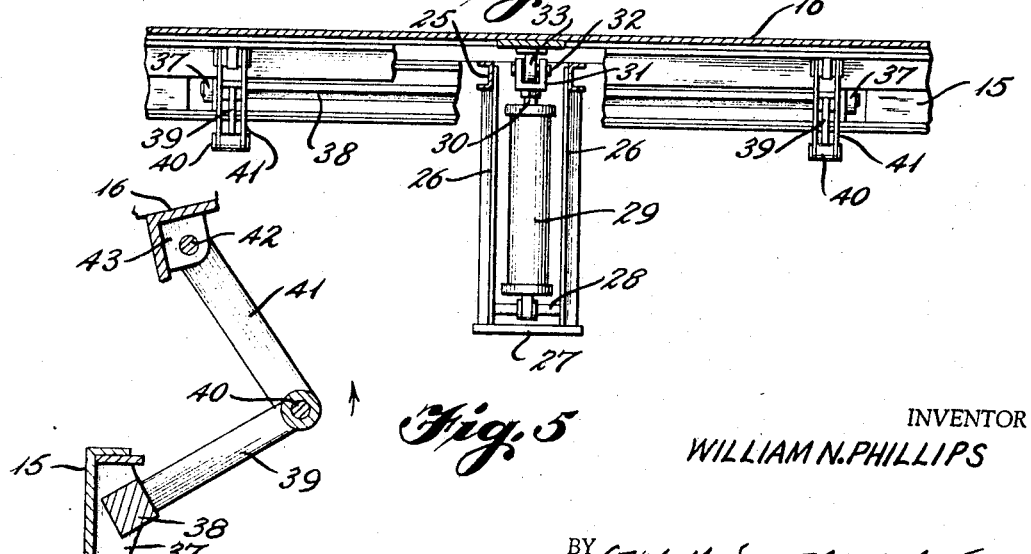
INVENTOR
WILLIAM N. PHILLIPS
BY
ATTORNEYS

United States Patent Office 3,450,436
Patented June 17, 1969

3,450,436
HIGH-LIFT SIDE DUMP MECHANISM
William Neal Phillips, Auburndale, Fla., assignor to Leco, Inc., Lakeland, Fla.
Filed Oct. 5, 1967, Ser. No. 673,173
Int. Cl. B60p *1/34;* B61d *9/02*
U.S. Cl. 298—11                                       1 Claim

ABSTRACT OF THE DISCLOSURE

An apparatus for tilting a high-lift truck body at any height by using a single hydraulic cylinder in cooperation with an equalizer torque tube which causes the body to dump evenly regardless of the load distribution.

BACKGROUND OF THE INVENTION

Field of the invention

This invention relates generally to mechanisms utilized in the tilting of truck bodies to remove the contents therefrom and relates particularly to high-lift truck bodies which can be tilted and dumped at any desired height. Also the invention relates to truck bodies which can be dumped by a single hydraulic cylinder in cooperation with an equalizer torque tube which permits the body to be dumped regardless of unequal load distribution.

Description of the prior art

Many devices have been provided for tilting or dumping various truck bodies either to the rear or to one side. In certain instances a single hydraulic cylinder has been used but has not been satisfactory since unequal load distribution has caused uneven wear on the hinge members which in turn would bind and resist tilting. Efforts have been made to overcome this by providing a pair of hydraulic cylinders which were located either below the truck body or on the side opposite the hinges. The cylinders beneath the body have not been satisfactory since normally the cylinders would extend downwardly too far and cause a ground clearance problem. The cylinders on the side opposite the hinges have not been satisfactory because the fluid lines were exposed and would become entangled with tree limbs and other growth or obstructions. Some cylinders on the side of the body have been recessed within the body to protect the cylinders and fluid lines; however, they have taken up valuable cargo space and have required relatively large expensive cylinders to operate correctly.

SUMMARY OF THE INVENTION

The present invention is an apparatus for tilting a truck body having one side hingedly mounted to the frame of the vehicle and adapted to dump the contents of the body to one side of the vehicle. Such apparatus includes a single relatively short fluid cylinder mounted below the truck body and adapted to be extended and retracted so that the body will pivot around the hinges. In order to tilt the body evenly without undue stress on the hinges, an equalizer torque tube is mounted on the opposite side of the frame and the opposite ends of such tube are connected by pivoted links to the truck body. When the cylinder is operated, any unequal load will be taken by one end of the torque tube and distributed to the other end of such tube so that the resulting action on the hinges will be substantially equal.

BRIEF DESCRIPTION OF THE DRAWINGS

FIG. 3 is an enlarged rear elevation with portions broken away for clarity.

FIG. 4 is a section on the line 4—4 of FIG. 3.

FIG. 5 is an enlarged section on the line 5—5 of FIG. 4.

DESCRIPTION OF THE PREFERRED EMBODIMENT

Figure 1:
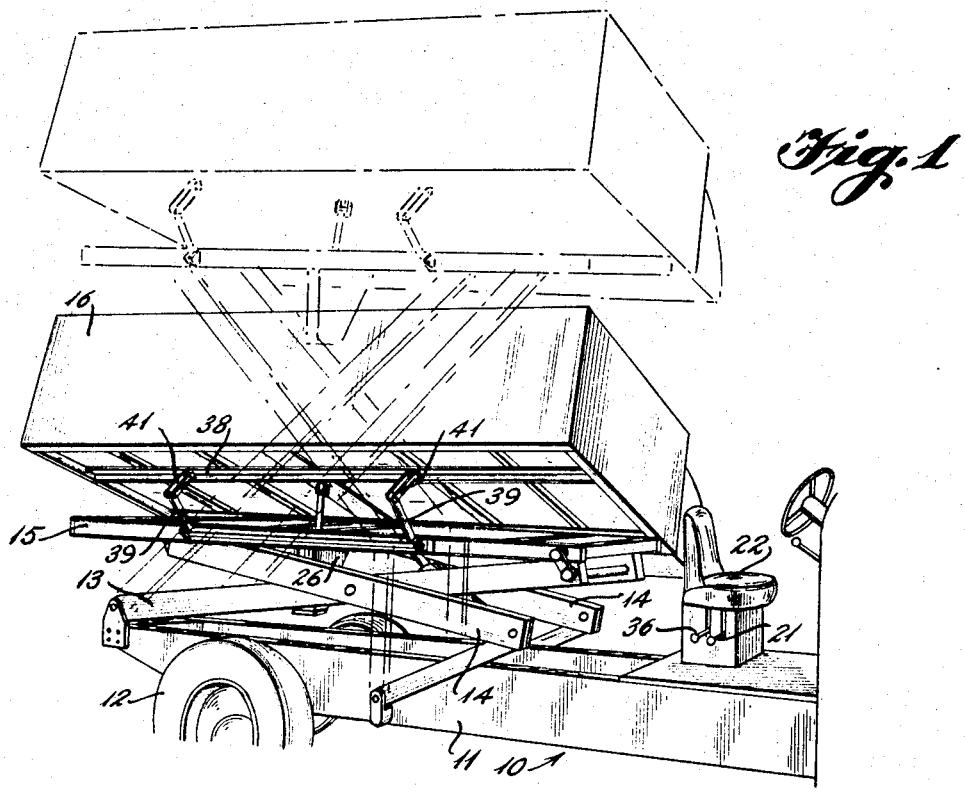
FIG. 1 is a perspective illustrating one application of the invention.
Figure 2:
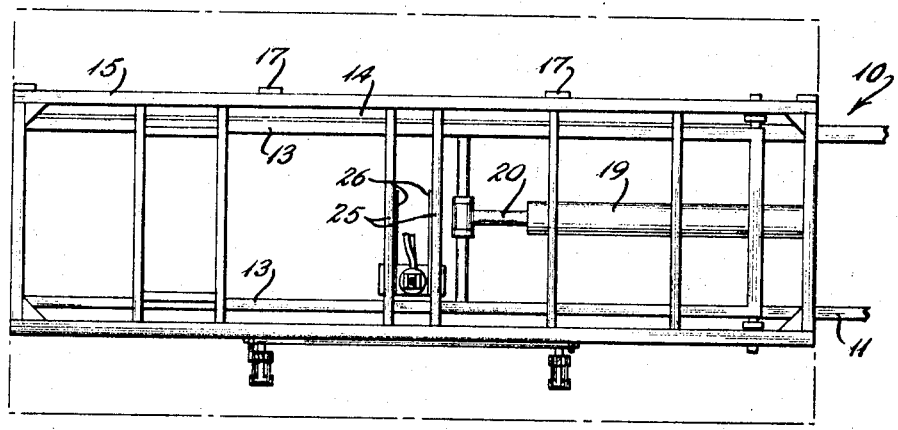
FIG. 2 is a top view of the vehicle frame with the dump body illustrated in phantom.

With continued reference to the drawings, a truck or other vehicle 10 has a chassis 11 supported by ground-engaging wheels 12. As illustrated the vehicle is provided with high-lift arms 13 and 14 on each side of the chassis 11 with one of the arms being pivotally mounted to the chassis and the other arm being movable relative thereto. The opposite ends of the arms 13 and 14 support a frame 15 on which a dump body 16 is pivotally mounted on one side by hinges 17 carried by the frame. The chassis 11, lift arms 13 and 14 and the frame 15 constitute an underbody of the vehicle.

The side of the body 16 which is adjacent to the hinges 17 is adapted to be opened in any desired manner, as by providing hinges 18 which permit the side to pivot outwardly generally in alignment with the bottom of the body. The frame 15 can be raised and lowered in any desired manner, as by a fluid cylinder 19 pivotally mounted at one end to the chassis 11 and adapted to extend and retract a piston rod 20 which causes a scissors action of the high-lift arms 13 and 14. The flow of fluid to the cylinder 19 is controlled by the operator of the vehicle by means of a lever 21 located in an accessible position relative to the operator's seat 22. The structure thus far described is conventional in the prior art and forms no part of the present invention.

It is desirable to tilt the body 16 about the hinges 17 to cause material within the body to be discharged. In order to tilt the body 16 a pair of structural support members 25 are provided which extend from one side of the frame 15 to the other in spaced generally parallel relation to each other. To each of the support members 25 is welded or otherwise attached a protective support plate 26, the lower ends of which are connected together by a brace 27. A rod or shaft 28 is provided which extends from one plate 26 to the other and is adapted to provide a pivotal mounting for a fluid cylinder 29 having a piston rod 30 with a yoke 31 mounted on its free end. The yoke 31 is connected by a pivot pin 32 to a lug 33 mounted on the bottom of the body 16.

The cylinder 29 may be of the single acting type having a hydraulic line 34 at its lower end through which fluid under pressure is introduced into the cylinder to raise the piston rod 30 and pivot the body 16 about the hinges 17. After the material within the body has been discharged the pressure on the cylinder is relieved and the weight of the body will force the fluid in the cylinder back through the line 34 and return the body to a resting position on the frame 15. If desired the cylinder 29 can be of the double acting type, as illustrated, and have fluid lines 34 and 35 for positive control of the body 16 in either direction. The flow of fluid to and from the cylinder 29 is controlled by a lever 36 located in an accessible position relative to the operator's seat 22 so that the body 16 can be tilted or dumped at any desired elevation.

It is contemplated that only one fluid cylinder 29 will be used to tilt the body 16 and that this might cause undue wear on the hinges 17 when the load within the body is unequally distributed. In order to prevent such wear on the hinges, the frame 15 is provided with a pair of spaced bearings 37 on the side opposite the hinges 17. Such bearings are adapted to freely rotatably receive the opposite ends of a torque tube 38 having a lower link 39 welded or otherwise permanently attached adjacent each end. Such lower links are positioned with one link forwardly of the cylinder 29 and the other link rearwardly thereof and substantially equally spaced therefrom. The opposite end of each of the links 39 is pivotally connected by a pin 40 to one end of an upper link 41. The other end of the upper link is connected by a pin 42 to a lug 43 mounted on the bottom of the body 16.

In the operation of the device, the body 16 is at least partially filled with any desired material and thereafter the vehicle is driven to a discharge area for dumping such material. When the vehicle is in position the lever 21 can be operated to raise the frame 15 and the body 16 to a desired height, after which the side of the body is released so that material can be discharged therefrom. When the side is in position the lever 36 will be operated to introduce fluid into the cylinder 29 through the fluid line 34 which will cause the piston rod 30 to be extended to raise one side of the body and pivot such body about the hinges 17. The weight of the material within the body is equally distributed on all of the hinges due to the equalizer torque tube and links. If most of the weight is located at one end of the body, the lighter end of the body will have a tendency to be raised first and in so doing will apply an upward force to the links 41 and 39 and create a torque in the tube 38. The tube 38 in turn will transmit an upward force to the opposite end where it will be reflected in an upward movement of the links 39 and 41 to equally distribute the weight on the hinges 17.

It is noted that although the vehicle has been illustrated and described as a high-lift vehicle, it is contemplated that the tilting mechanism could be located on the underbody or chassis of a conventional side or rear dump truck which does not have the high-lift arms.

It will be obvious to one skilled in the art that various changes may be made in the invention without departing from the spirit and scope thereof and therefore the invention is not limited by that which is illustrated in the drawings and described in the specification, but only as indicated in the accompanying claim.

What is claimed is:

1. In a truck having a chassis with a pair of high-lift arms mounted on each side thereof, a frame having arms, and a first fluid cylinder for raising the arms and the spaced generally parallel side members carried by said frame, that improvement comprising a dump body overlying said frame and extending outwardly to both sides thereof, spaced hinges connecting said dump body to one of the side members of said frame, a pair of spaced bearings fixed to the outer surface of the other side member of said frame, an elongated torque member freely rotatably mounted within said bearings, a first pair of links fixed at one end to said torque member, one of said first pair of links being located adjacent to each of said bearings, a second pair of links swingably connected at one end to the opposite ends of said first pair of links and swingably connected at the other end to said dump body, said links being of a length to remain entirely beneath said body, a housing mounted between the side members of said frame and extending downwardly therefrom, said housing being mounted generally transversely of said frame and being closed at the front and back to exclude foreign matter when the truck is moving, a second fluid cylinder swingably mounted within said housing, said second fluid cylinder having a piston rod swingably connected to said dump body intermediate said pairs of links and providing the sole tilting means for said dump body, and means for operating said first and second fluid cylinders from a remote position, whereby operation of said second fluid cylinder tilts one side of said dump body about said hinges and said torque member and links equally distribute the weight of said body on said hinges.

References Cited

UNITED STATES PATENTS

| 489,243 | 1/1893 | Thacher. |
| 1,955,167 | 4/1934 | Barrett. |
| 2,731,293 | 1/1946 | Hutchinson. |
| 3,080,196 | 3/1963 | Darby. |
| 3,099,229 | 7/1963 | Wethly. |
| 3,136,566 | 6/1964 | Harding. |
| 3,240,164 | 3/1966 | Flowers. |
| 1,915,134 | 6/1933 | MacPherson. |

FOREIGN PATENTS

| 689,886 | 6/1964 | Canada. |
| 696,609 | 10/1930 | France. |
| 1,290,257 | 3/1962 | France. |
| 1,378,446 | 10/1964 | France. |

RICHARD J. JOHNSON, *Primary Examiner.*

U.S. Cl. X.R.

298—18

UNITED STATES PATENT OFFICE
CERTIFICATE OF CORRECTION

Patent No. 3,450,436            Dated June 17, 1969

Inventor(s) William Neal Phillips

It is certified that error appears in the above-identified patent and that said Letters Patent are hereby corrected as shown below:

Column 3, line 46, cancel "spaced generally parallel side members carried by said" and insert the same, after "having" in line 44 same column 3.

Signed and sealed this 30th day of May 1972.

(SEAL)
Attest:

EDWARD M. FLETCHER, JR.
Attesting Officer

ROBERT GOTTSCHALK
Commissioner of Patents